April 26, 1938.  P. E. ALLEN  2,115,405
TEETHING DEVICE
Filed Oct. 29, 1936
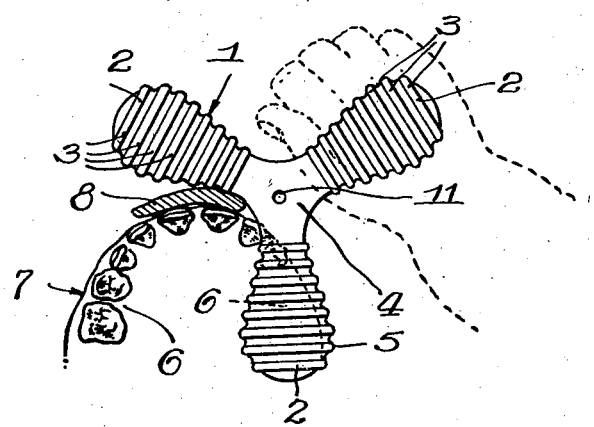
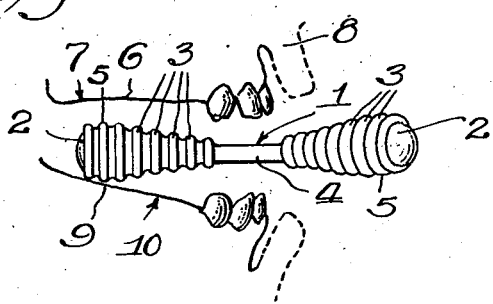
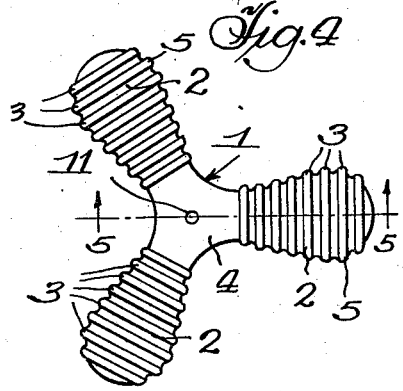
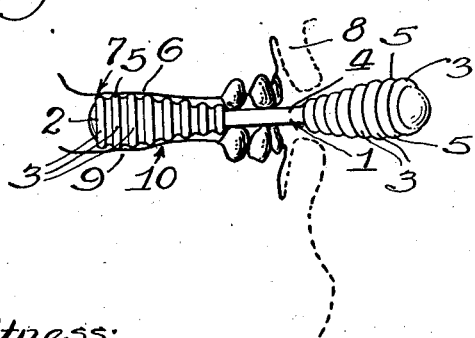
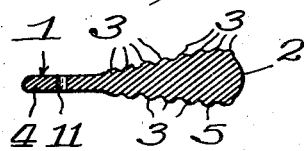
Witness:
Chas. E. Hursh
Inventor,
Paul E. Allen,
Parkinson & Lane, Attys.

Patented Apr. 26, 1938

2,115,405

UNITED STATES PATENT OFFICE 2,115,405

TEETHING DEVICE

Paul E. Allen, Niles Center, Ill.

Application October 29, 1936, Serial No. 108,175

2 Claims. (Cl. 128—359)

The present invention relates to a novel teething device and more in particular to such a construction so designed and arranged as to properly reach the areas of the gums which require stimulation and aid in the eruption of the teeth.

In the cutting of teeth by an infant there is normally little difficulty with the cutting of the anterior teeth which comprise the six upper and six lower teeth. These are the first to arrive and due to their knife-like edges, they readily cut or break through the gums. However, in the cutting or eruption of the posterior teeth or molars, since these are formed with a broad erupting surface having spaced cusps, they most generally cause considerable pain and soreness in the gums and require stimulation and aid in their eruption.

The present invention has for an object to aid in the stimulation of the gums and in the eruption of the posterior teeth. The novel device is so constructed, arranged and designed as to properly reach these areas through which the posterior teeth erupt, although the anterior teeth are in position. By the design of the present invention, the child may bite on the teething member with its anterior teeth and still get sufficient pressure in the molar area or rear portion of the dental arches for aiding in the eruption of the teeth in these areas.

A further object of the present invention is to provide a novel teething device having three equally spaced projections so designed and arranged that one may be grasped by the infant in its fist or closed hand, thus leaving available two projections, either one of which may be inserted into the mouth and the other provide a stop or abutment preventing the insertion of the first mentioned projection into the mouth beyond a predetermined depth not sufficient to cause gagging or any inconvenience to the infant. It will be readily appreciated that by reason of the predetermined and correct spacing of the projections, only one may be inserted in the mouth at a time.

Another distinct advantage of the present invention is that when the device is inserted in the mouth of the infant, there is nothing that interferes with the tongue or which would be of a sufficient length to touch the soft palate. Thus it will be noted that no portion of the device will overlie the tongue sufficient to interfere with it or cause gagging or choking.

A further object of the invention is to provide a teething device with suitable raised portions in the form of ridges, corrugations or protuberances which will cause a more effective massaging of the gums. These raised portions or protuberances may be of any shape or design effective for the purpose, although it is to be understood that the device may be made smooth, if desired.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:—

Fig. 1 is a view from underneath of the upper dental arch with the teething device held in position by the hand of an infant.

Fig. 2 is a view in side elevation of the teething device being inserted in the mouth, while Figure 3 shows the position the device assumes after it has been inserted and the infant closes its teeth thereon.

Fig. 4 is a plan view of the novel device.

Fig. 5 is a view in vertical cross section taken in a plane represented by the line 5—5 of Fig. 4.

Referring more particularly to the disclosure in the drawing, the novel teething device 1 is provided with three equally spaced projections 2 of similar contour. Each of these projections is preferably formed with raised ribs or corrugations 3, although it is to be understood that these projections may be made plain or provided with any suitable embossments or protuberances as desired. The projections 2 are connected by a central portion 4 of substantially less thickness than the outer ends and in their preferred form these projections preferably increase in thickness and width from the central portion 4 to substantially the point 5 which is adjacent the outer ends. The shape of these projections is such that a vertical cross sectional view therethrough would be substantially elliptical, the purpose of which is to provide a maximum contact area for engagement with the gums, while the shape of the entire device lends itself to the contour of the dental arches and permits the central portion 4 thereof to be placed or located intermediate the anterior teeth which have already erupted. The ends being of substantially greater thickness than the central portion, will apply the desired pressure to the molar or posterior area of the gums. The device is preferably formed of rubber or other suitable flexible material which may be readily sterilized, and if desired, it may be stiffened with a hard rubber or metal core.

Figs. 1, 2 and 3 show the position of the device in the mouth of the infant. In Fig. 1, the one projection is in position to apply pressure to the molar area 6 of the upper dental arch 7, while another of the projections is being held by the infant, and the third seats against a portion of the upper lip 8 and the anterior teeth in the upper dental arch.

In Figs. 2 and 3, the one projection 2 is shown being inserted into the mouth and in contact with the molar area 9 of the lower dental arch 10, while Fig. 3 shows the dental arches 7 and 10 in closed position with this projection in engagement with and applying pressure to the molar areas 6 and 9 of these dental arches. At this time the central portion 4 of the device is positioned intermediate the anterior teeth in the upper and lower arches. Due to the scientifically designed contour of the device, the infants' biting upon the central portion, does not prevent the projection inserted in the mouth from applying the necessary pressure to the molar areas for adequately massaging the gums.

If desired, an opening 11 may be provided for the insertion of a cord, ribbon or the like by which it may be hung up or suspended.

From the above description and the disclosure ing the drawing, it will be readily apparent that the novel design and construction of the teething device with its three equally spaced projections, permits but one projection being inserted into the mouth of the infant, and when so inserted, the hand of the infant grasps one of the two remaining projections while the other forms a stop or abutment preventing the device from being inserted to a distance or depth sufficient to cause gagging or choking. When in this position, no part of this device can interfere with the tongue or reach the soft palate. The particular shape of the projections with their gradually increasing thickness permits the application of sufficient pressure to the molar areas while the front or anterior teeth are in position.

Having thus disclosed the invention, I claim:

1. A teething device for infants composed of resilient material and comprising a relatively thin central portion, and equally spaced integral projections extending therefrom, the projections being of sufficient length to reach the back portion of the molar area and being of relatively small width and thickness near the central portion but increasing in width and thickness toward their outer ends, the length being substantially greater than the width whereby when one projection is inserted into the mouth of an infant the anterior teeth may engage the central portion and the projection may be freely moved so as to engage the molar area of the gums on either side of the mouth to massage the gums without substantially contacting the tongue and causing gagging or choking.

2. A teething device for infants composed of resilient material and having a central portion and projections extending therefrom, the central portion being substantially thin near the projections for engagement by the anterior teeth of the infant, the projections being of relatively small width and thickness near the central portion but increasing in width and thickness toward their outer ends so as to engage the molar area of the gums, and of sufficient length to reach the rear of the molar area of the gums when the anterior teeth are engaging the central portion, the projections having protuberances for applying pressure to and massaging the gums of the molar area upon biting action of the infant.

PAUL E. ALLEN.